United States Patent Office 3,369,313
Patented Feb. 20, 1968

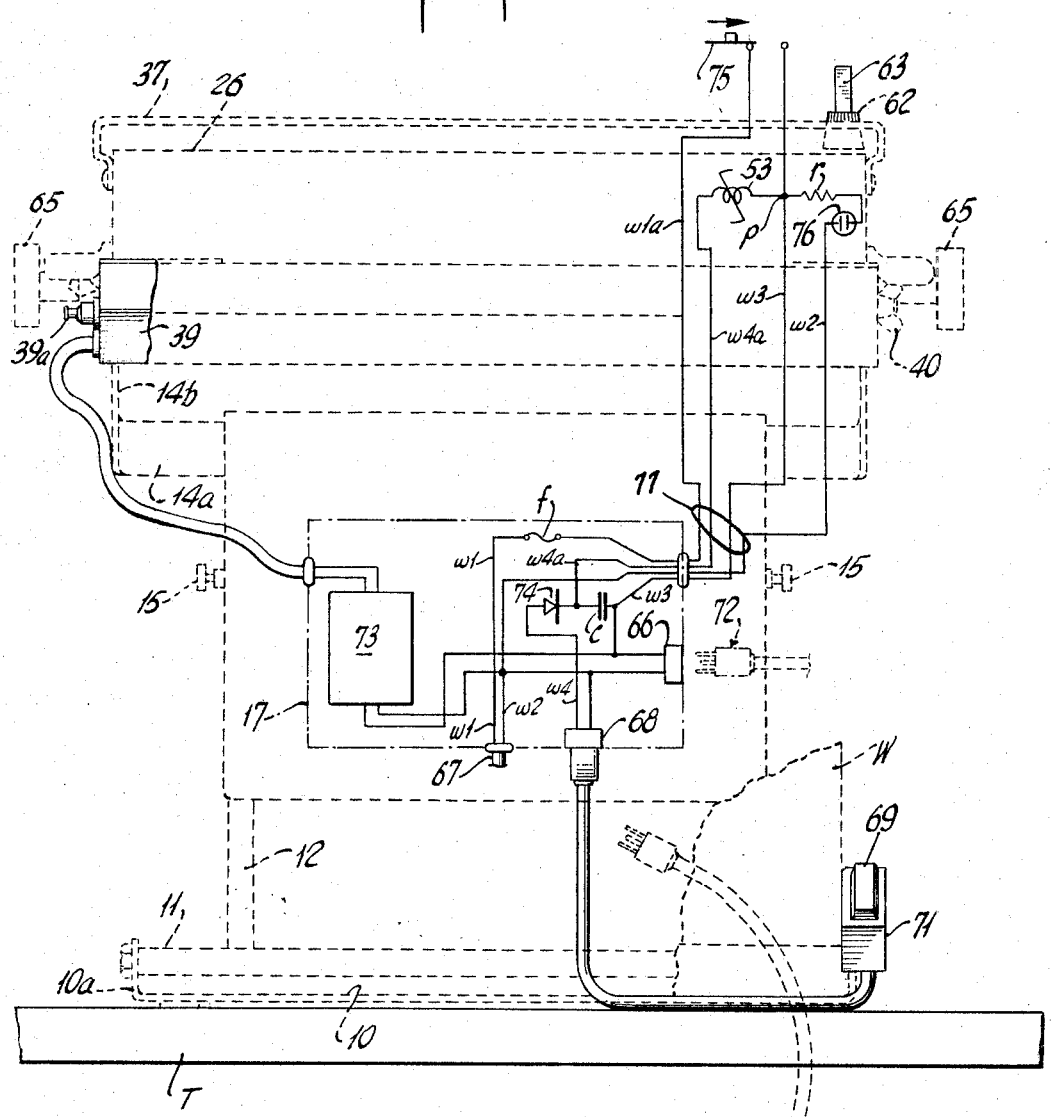

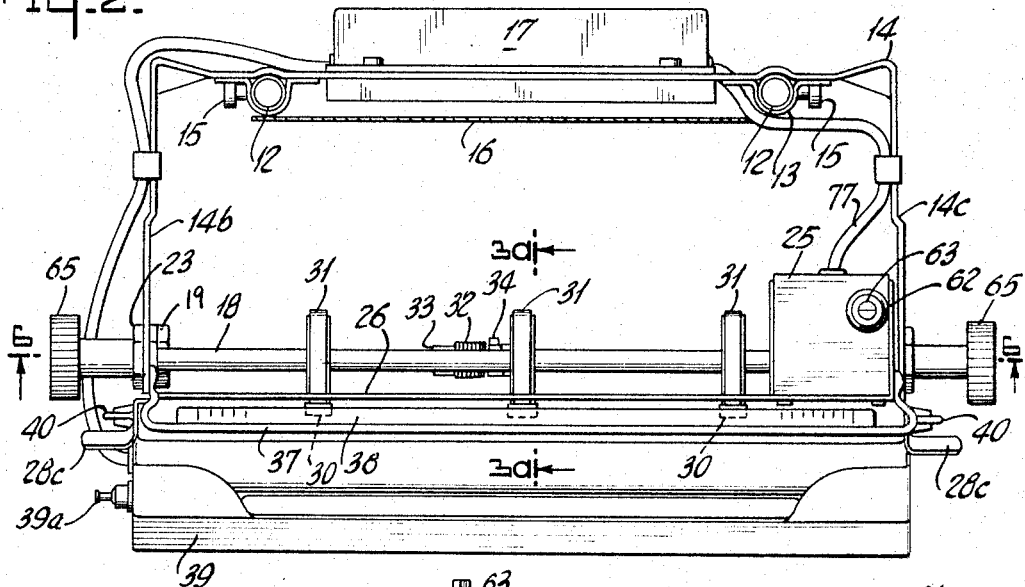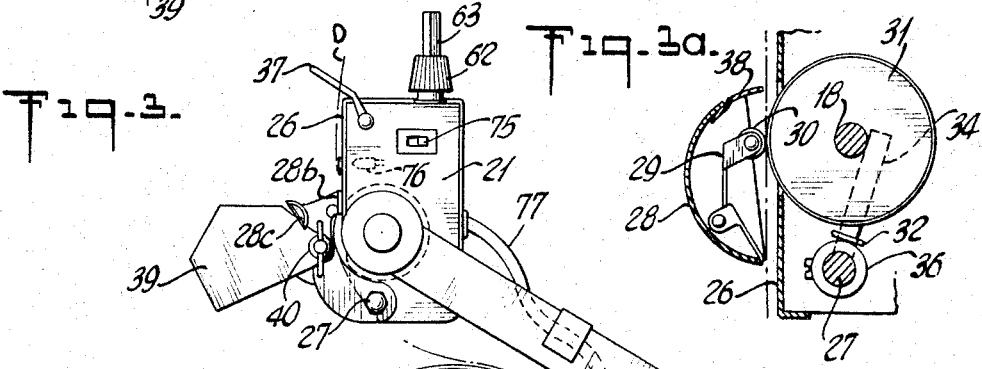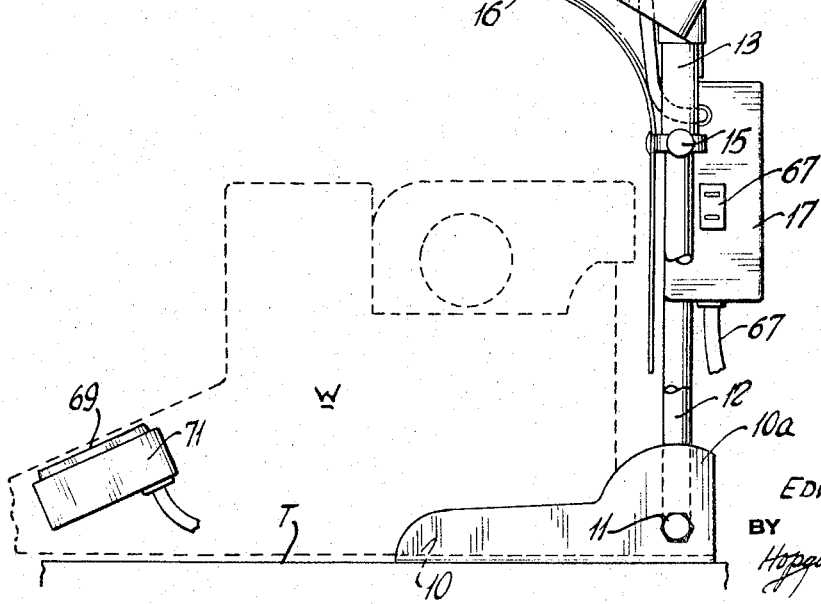

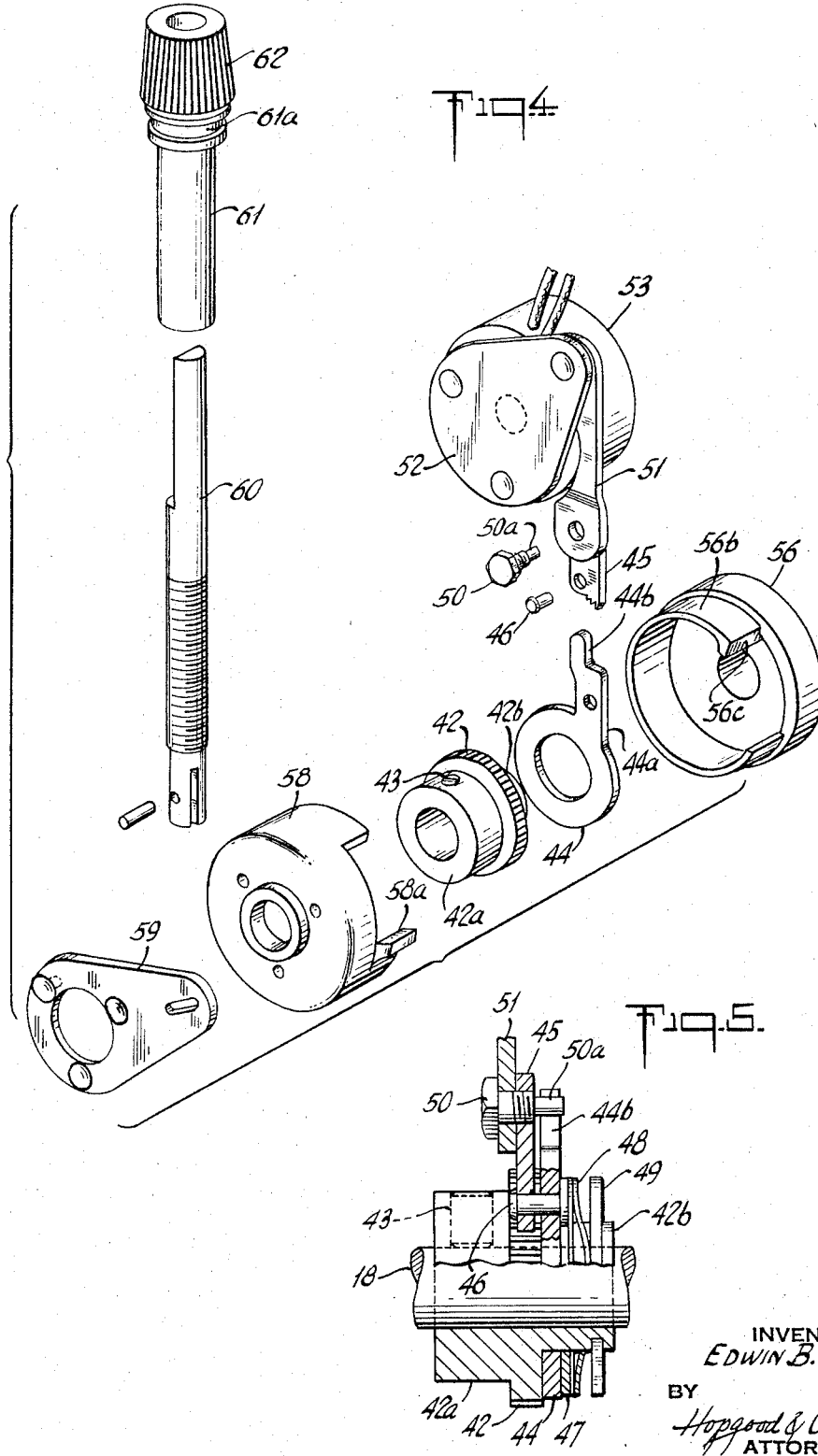

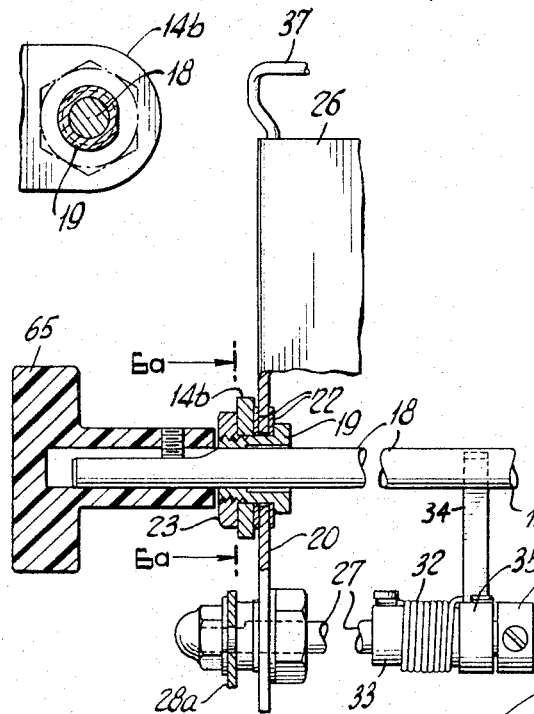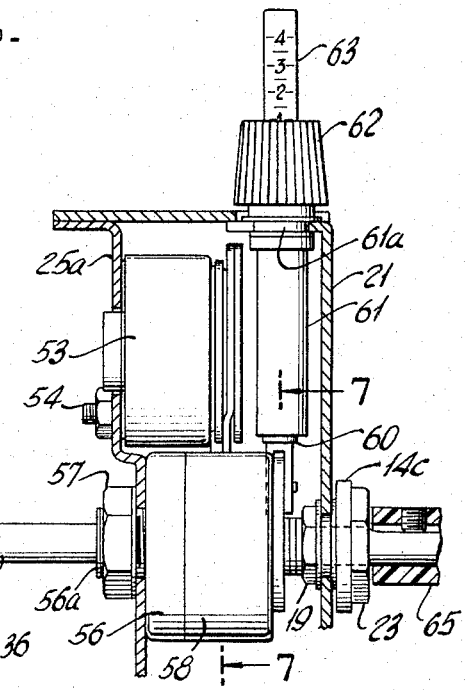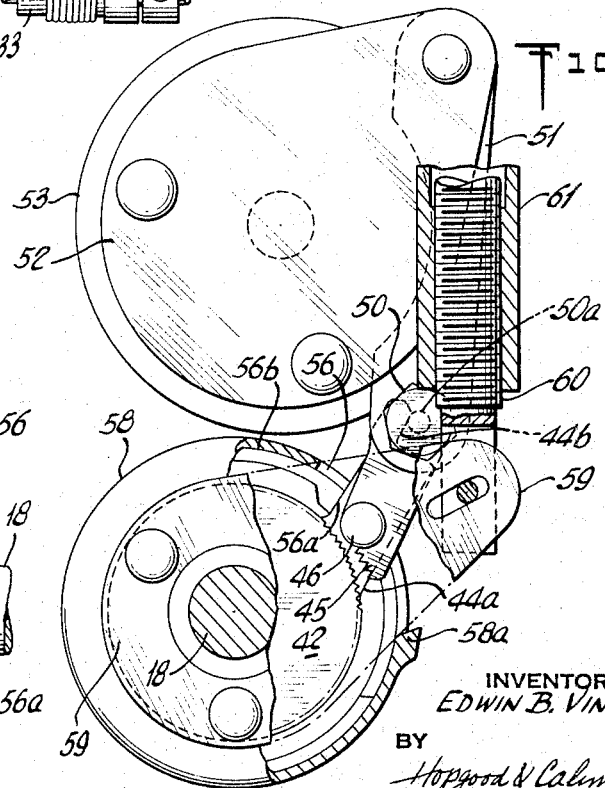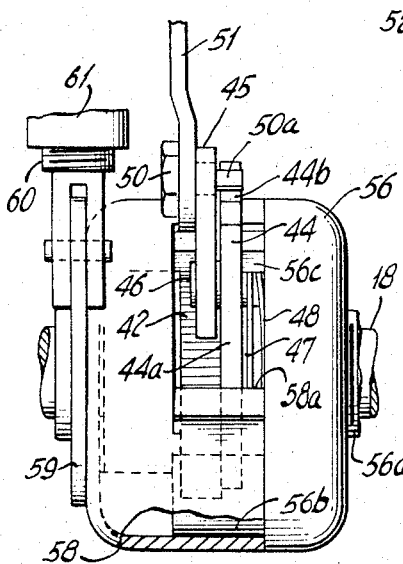

3,369,313
COPY HOLDER
Edwin B. Vincent, East Norwich, N.Y., assignor to Pres-To-Line Corporation of America, New York, N.Y., a corporation of New York
Continuation of application Ser. No. 407,798, Oct. 30, 1964. This application Jan. 13, 1967, Ser. No. 609,263
4 Claims. (Cl. 40—343)

ABSTRACT OF THE DISCLOSURE

This invention, generally, relates to a copy holder as an adjunct to a typewriter. A copy holder head cooperates with means for holding and advancing a data sheet. Special means are provided for advancing the data sheet line by line and includes means for selecting the line space interval and for adjusting the tilt angle of the head.

---

This application is a continuation of application 407,-798 filed Oct. 30, 1964, now abandoned.

This invention relates to copy holders used as adjuncts to typewriters, keyed accounting machines, and the like, to bring to view, line by line, written data to be typed or entered by the operator.

The copy holder is a self-contained unit stationed just behind the typewriter or other principal machine and adapted to hold a data sheet in face view of the operator. The head of the copy holder receives the data sheet between feed roller means on a platen shaft and coacting pressure rolls. Line spacing means of the copy holder is operated at the will of the operator to turn the platen shaft for advancing one line after another of the data sheet to a viewing position.

One object of the present invention is to provide a copy holder with power actuated line spacing means to function rapidly at the command of the operator. Previous copy holders relied on comparatively slow manual actuation of the line spacing means, having cumulatively tiring effect on the operator and entailing a significant loss of useful machine work time. The power actuated line spacing means, as provided by the invention, substantially reduces the burden of the operator and the loss of useful machine work time and, also, insures performance of a full, consistent line spacing step.

More specifically, the invention provides a copy holder with an electric actuator for the line spacing mechanism, the actuator to be impulsed at the will of the operator for producing one line spacing step for each impulse. Impulsing occurs upon manual operation of a switch in easy reach of the operator. The switch is preferably a depressible or push type at the end of a flexible cable leading to the copy holder. Either a finger push button switch or a treadle switch may be plug-connected to the copy holder.

Still more specifically, the invention provides a line spacing actuator in the form of a magnetic device. Particularly, the invention provides a rotary type solenoid of which the rockable armature is connected to a drive pawl for a clutch wheel on the line spacing shaft, here conveniently the platen shaft. At each impulsing of the solenoid, the armature is reciprocated to actuate the pawl for turning the clutch wheel and line spacing shaft through a line spacing interval. Rectifying and smoothing means may be provided in the copy holder to enable a D.C. solenoid to be used with an A.C. supply line.

Another object of the invention is to provide a copy holder with improved selecting means for the line spacing interval. More specifically, the invention provides on the head of the copy holder an accessible micrometer device to adjust a stop for a reciprocable element of the line spacing means. The stop is particularly in the path of a drive pawl for a clutch wheel on the line spacing shaft and can be set by the micrometer means in any of an infinite number of positions within a given range. For example, the maximum line spacing interval may be one inch and the stop may be adjusted to select any line spacing interval between zero and one inch.

An object of the invention is to provide a copy holder with a tiltable head structure angularly adjustable to an operator-reading convenience angle without affecting the platen shaft. This aspect of the invention involves journaling of the platen shaft by means which remains stationary during angular adjustment of the tiltable head structure. More specifically, the tiltable head structure is here pivotally mounted concentrically with the platen shaft. In particular, the tiltable head structure is mounted on pivot elements within which the platen shaft is journaled. One advantage afforded by this aspect of the invention is that any imbalance of forces at opposite sides of the tiltable head structure will not be transmitted to the platen shaft and will not produce a twisting bind thereon to interfere with its rotative movement, particularly with its rotative stepping by the line spacing means. Another advantage is that angular adjustment of the tiltable head structure will not change the position of the platen shaft and the operator-reading distance to the data line at reading position. Previously, a copy holder had an angularly adjustable head structure with radius arms bodily carrying the platen shaft at a distance from the axis of the head structure. As a result, unbalanced forces at opposite sides of the tiltable head structure would act through the radius arms to produce a twisting bind on the platen shaft interfering with its rotative stepping. Further, a change in angular position of the tiltable head structure bodily displaced the platen shaft and changed the distance to the operator of the data line at reading position, requiring a compensating adjustment of the supporting means for the head structure in order to re-establish the proper reading distance. These difficulties are overcome by the present invention.

The copy holder is often used with an electric typewriting machine or other electric data machine. The invention provides for electric power to the associated machine to be led through the copy holder which is furnished with a switch to turn power on or off and with a pilot light to alert a viewer that power is on. The switch and pilot light serve not only the associated electric data machine but also serve the electric circuits of the copy holder itself.

The above mentioned and other features and objects of this invention and the manner of attaining them will become more apparent and the invention itself will best be understood by reference to the following description of an embodiment of the invention taken in conjunction with the accompanying drawings wherein:

FIG. 1 is a schematic front elevation of the subject copy holder and also shows the circuitry of the copy holder;

FIG. 2 is a plan view of the copy holder;

FIG. 3 is a right side view of the copy holder and also shown in dot-dash outline is a typical typewriter in association with the copy holder;

FIG. 3a is a fragmentary section on line 3a—3a of FIG. 2;

FIG. 4 is an exploded view of the line spacing means;

FIG. 5 is a partly sectioned side view of the clutch assembly of the line spacing means;

FIG. 6 is a section on line 6—6 of FIG. 2;

FIG. 6a is a fragmentary section on line 6a—6a of FIG. 6;

FIG. 7 is a section along line 7—7 of FIG. 6; and

FIG. 8 is a fragmentary view looking at the right of FIG. 7.

As illustrative, the copy holder is shown in FIG. 3 in working position behind a typewriter W on a desk top T. The frame of the copy holder includes a horizontal base plate 10 having upturned sides 10a (also see FIG. 1). Base plate 10 rests on the desk top and the typewriter sits on the base plate and by its weight holds the copy holder in working position. Fixed between the sides 10a of the base plate is a bar 11 from which a pair of posts 12 rigidly rise. Fitting around the posts are sleeves 13 locked into loops in the back of a U-shaped, cantilever frame 14 having forwardly extending side arms 14b and 14c (also see FIG. 2). The frame 14 is vertically adjustable along the posts 12 and retained in adjusted position by set screws 15 threaded into enlarged lower ends of the sleeves 13. Rigidly attached to the front of the enlarged sleeve ends is a guide plate 16 for a data sheet D inserted in the copy holder. Suitably fixed to the back 14a of the frame 14 is a cabinet 17 for the electrical wiring of the copyholder.

The head of the copy holder is supported above the typewriter by the front ends of the frame arms 14b and 14c. The copy holder head includes a platen shaft 18 journaled within internal bearing surfaces of a pair of headed bushings 19 carried by the frame arms 14b and 14c. Bushings 19 have externally threaded stems passing through front openings in the frame arms, chordal flats of the openings and stems (see FIG. 6a) preventing turning of the bushings relative to the frame arms. Each bushing 19 has an external smooth bearing surface between its head and thread. An angularly adjustable, tiltable, head structure is pivotally mounted on the external bearing surfaces of the two bushings by means of rigidly connected left and right side elements 20 and 21 of the tiltable head structure. Washers 22 flank each of these side elements. The protruding threaded ends of the bushings 19 receive retaining nuts 23 which are tightened to produce sufficient frictional drag of the washers 22 on the side elements 20 and 21 to prevent accidental tilting of the head structure. Attention is called to the fact that the tightening of the nuts 23 may produce unequal lateral pressures on the opposite side elements 20 and 21 of the tiltable head structure. But such imbalance of forces or any forces tending to twist the tiltable head structure will be absorbed by the frame-based bushings 19 and will not be transmitted to the platen shaft 18 and will not produce a twisting bind on the platen shaft, so that rotative operation of the platen shaft will not be hindered in any way.

The right side element 21 of the tiltable head structure is also the right side wall of a housing 25 for elements of the line spacing means. The left side element 20 is a rearwardly and right angularly bent arm of a face plate 26 which extends across the copy holder and is firmly fastened to the front of the housing 25. Below the platen shaft 18 is a rod 27 (FIGS. 3, 3a and 6) pivotally carried between the side elements 20 and 21. The protruding ends of the rod 27 rigidly carry arms 28a of a pressure roll-carrying bail 28. Pivoted on the crosspiece of the bail are holders 29 for pressure rolls 30, the holders being spring-biased in known manner to influence the pressure rolls toward feed rolls 31 fixed on platen shaft 18 and protruding through openings in the face plate 26.

A coil spring 32 encircles the rod 27 and has one end hooked to a collar 33 (see FIG. 6) fixed to the rod. The other end of the spring is hooked to an arm 34 reaching upwardly behind the platen shaft 18 and having a hub 35 free on the rod 27. A collar 36 is set on the rod to limit lateral movement of the hub 35 and its arm 34. The force of the spring 32 urges the arm 34 counterclockwise (FIG. 3a) into braking engagement with the back of the platen shaft to prevent overthrow of the shaft when actuated through a line space by the line spacing means. The spring 32 also urges the rod 27 and the bail 28 fixed thereto in clockwise direction in order to maintain the pressure rolls 30 in their coacting relation to the platen rollers 31. A clockwise limit position for the bail is established by engagement of tabs 28b of the bail arms 28a with the front of the housing 25 and the front of the face plate 26. Finger pieces 28c of the bail arms may be grasped to move the bail downward, counterclockwise, to facilitate insertion of a data sheet between the pressure rolls and the platen rollers. The data sheet is disposed in front of the face plate, is led over the guide plate 16 below the copy holder head, and may be guided above the face plate by a wire guide bail 37 hinged to the side elements 20 and 21 of the tiltable head structure. An index member 38 carried by the bail 28 marks the reading position for a data line of the data sheet. To illuminate the data sheet, a fluorescent lamp 39 having a switch 39a is hinged to the bail arms 28a and locked in position by wing nuts 40.

Power actuated line spacing means is provided by the invention for turning the platen shaft 18 to move the data sheet upwardly so as to bring a next data line to the reading position. The line spacing means includes a fine-toothed clutch wheel 42 (FIGS. 4, 5, 7 and 8) having an integral hub which has a close fit on the platen shaft. The hub extends to opposite sides of the clutch wheel, the hub section 42a to the left being substantially larger in diameter than the hub section 42b to the right. The clutch wheel is fixed in position on the platen shaft by a set screw 43 mounted in the hub section 42a. Rotatively mounted on the hub section 42b is a pawl carrier 44 having an arm 44a which pivotally carries a drive pawl 45 for the clutch wheel 42, pawl pivot 46 being peened over to prevent removal of the pawl from the carrier. As known, the teeth on the pawl nose match the spacing of the clutch wheel teeth and are disposed so that the pawl will engage the clutch wheel when first rocked clockwise (FIG. 7) relative to the pawl carrier and will withdraw from the clutch wheel upon reverse relative rocking. In order for the pawl to rock relative to the pawl carrier as a preliminary to each forward and return stroke of the pawl and carrier, rotative movement of the carrier is frictionally retarded by pinching it between a side of the clutch wheel and a flat washer 47 which has an outside diameter small enough not to reach the pawl pivot 46. The pinching pressure is applied by a spring washer 48 between washer 47 and a horseshoe retainer 49 seated in a groove of the clutch wheel hub section 42b.

The tail end of the pawl 45 carries a headed pivot stud 50 having a smooth section between its head and thread for reception in a hole at the lower end of a link 51. The stud 50 has reduced end 50a which abuts a shoulder 44b of the pawl carrier 44 to limit rearward or counterclockwise rocking of the pawl relative to the pawl carrier. The upper end of the link 51 is pivotally connected to a rockable armature plate 52 of a rotary type solenoid 53 which contains a spring (not shown) to bias the armature counterclockwise (FIGS. 4 and 7) to home position. The solenoid is mounted inside the housing 25, being bolted to the left side wall 25a of the housing, one of the bolts 54 appearing in FIG. 6.

Below the solenoid 53, the housing 25 contains a cup member 56 with an externally threaded outside hub 56a loosely fitted on the platen shaft 18 and receiving a nut 57 for clamping the cup to the left side wall 25a of the housing. Cup 56 encloses the clutch parts but its flange 56b is interrupted by an opening through which the pawl carrier arm 44a and the pawl 45 protrude. The flange opening has an angular span at least equal to the maximum throw for the pawl and pawl carrier. The start or return position of the pawl and carrier is fixed by encounter of the pawl carrier arm 44a with a rear blunted end 56c of the opening in the cup flange. The forward clutch wheel driving throw of the pawl and pawl carrier is adjustably determined by the setting of a cup-shaped stop member 58 facing the cup 56 and having a hub loosely fitted on the platen shaft. The rim of the member 58 is rotatively nested on the flange 56b of the cup and has an opening at least equal in angular span to the opening in the cup flange. At its front end, the opening in the rim of the member 58 is formed with a stop lug 58a which is in the path of the pawl 45 above its pivot 46. During the forward stroke of the pawl and pawl carrier, the pawl first encounters the stop lug 58a and is rocked rearwardly relative to the pawl carrier so as to disengage the clutch wheel 42. The forward stroke of the pawl and carrier is stopped when the pawl carrier arm 44a also strikes the stop lug 58a.

The invention provides micrometer means for rotatively adjusting the member 58 to select the line space interval. The adjusting means includes an arm 59 fixed to the base of the member 58 and having pin and slot connection with the lower end of a screw 60. The screw is threaded into a sleeve 61 suitably rotatively held by the housing 25. The rotative mounting for the sleeve may be afforded, for instance, by providing the sleeve with a peripheral groove 61a to receive a suitably shaped edge of the horizontally bent upper flange of the housing wall 21. The rotative mounting may be improved by fitting the groove 61a with a liner. Above the housing, the sleeve 61 has fixed to it a knob 62 whereby the sleeve may be turned to move the screw 60 lengthwise and through the arm 59 to adjust the rotative stop position of the member 58 according to the desired line space interval. The upper length of the screw 60 is cut back to provide a flat surface to which is attached a scale 63 extending upwardly through and above the sleeve 61 and knob 62. The scale 63 is graduated for line space intervals and the selected interval is indexed by the top of the knob.

On energization of the solenoid 53, in a manner explained later, the armature 52 rocks clockwise and, through link 51, first moves the pawl 45 relative to the pawl carrier 44 into engagement with the clutch wheel 42, after which the armature moves the pawl, together with the pawl carrier, to drive the clutch wheel 42 until the pawl meets the stop lug 58a of the settable member 58. This causes the pawl to move relative to the pawl carrier in a direction to withdraw from the clutch wheel while the pawl carrier continues until it also meets the stop lug 58a, thus terminating the forward stroke of the armature, the pawl and pawl carrier. On deenergization of the solenoid, its armature returns counterclockwise, restoring the pawl and pawl carrier to start position where the carrier arm 44a abuts the fixed stop 56c.

In the above manner, each impulsing of solenoid 53 line spaces the platen shaft 18 through a preselected line space distance or interval. The platen shaft has the usual end knobs 65 by which it may be directly turned by the operator.

Referring particularly to FIG. 1, power for the circuits of the copy holder is obtained from a service outlet (115 volts A.C.) by plugging into the outlet a cord 67 anchored to the bottom of the cabinet 17 of the copy holder. The bottom of the cabinet also mounts a receptacle 68 into which, as shown, is plugged the cord of a finger push button switch 69 which may be attached to the side of a typewriter or other principal machine. Alternatively, a treadle switch 70 may be plugged into the receptacle 68. The right side wall of the cabinet 17 mounts an outlet 66 for receiving the plug cord 72 of an electric typewriter or other electric principal machine, so that power to the principal electric machine may be routed through the copy holder. Cabinet 17 also contains ballast 73 for the fluorescent lamp 39. In order to provide for D.C. energization of the solenoid 53, a rectifier 74 and condenser C are mounted in the cabinet.

Power for the circuits in and extending from the copy holder is turned on by manually closing a slide switch 75 mounted to the right side wall 21 of the housing 25 (also see FIG. 3). Also provided in the housing 25 and visible through an opening in the front of the housing is a pilot light 76, preferably a neon lamp, to alert a viewer that power is on. Closure of the slide switch 75 completes a circuit from one side of the supply line to connected wire w1, thence via a fuse f to a wire w1a which extends through a cable 77 to one terminal of the switch 75, then through the switch to a junction point p; from there the circuit branches through a resistor r and the pilot lamp 76 to a wire w2 which returns through the cable 77 to the opposite side of the supply line.

Power to the ballast 73 is routed through the switch 75. One input terminal of the ballast connects to the wire w2 and the other input terminal to a wire w3 which goes through the cable 77 to the junction point p.

The terminals of the outlet 66 respectively connect to the wires w2 and w3, whereby power for the electric principal machine plugged to the outlet 66 will be applied only with the switch 75 closed, and the fact that power is on for the principal machine as well as for the copy holder circuits is indicated by the pilot lamp 76.

With the switch 75 closed, the line spacing solenoid 53 is ready for operation under control of the push button switch 69 or the treadle switch 70, whichever is plugged to the receptacle 68. As shown, the push button switch is plugged in and its momentary closure by the operator establishes a circuit from one side of the supply line via the wire w2 to one terminal of the receptacle 68 and through the push button switch to the other terminal of the receptacle; from there the circuit continues via a lead w4 through the rectifier 74 to cabled wire w4a, thence through the solenoid 53 to the junction point p from where the circuit is completed through the switch 75, wire w1a, fuse f and wire w1 to the opposite side of the supply line. The condenser C is a smoothing condenser across the wires w3 and w4a, shunting the solenoid.

While I have described above the principles of my invention in connection with specific apparatus, it is to be clearly understood that this description is made only by way of example and not as a limitation to the scope of my invention as set forth in the objects thereof and in the accompanying claims.

I claim:

1. A data sheet handling copy holder for use as an adjunct to a typewriter or other operator-indexed data machine, the copy holder comprising a copy holder head, a platen having a shaft journaled on the head, pressure means carried by the head for coating with the platen to hold a data sheet therebetween, means including a rotary solenoid for line spacing the data sheet and further including a reciprocable drive element for the platen shaft, and means for selecting the line space interval including an adjustable stop in the path of the reciprocable drive element, and micrometer means for setting the stop, said micrometer means comprising a screw operatively connected to the stop and a sleeve nut accessible for turning by the operator to adjust the screw and thereby adjust the stop, said line spacing means including a toothed clutch wheel connected to the platen shaft, said reciprocable element being a drive pawl for the clutch wheel, said stop being adjustable concentrically with the clutch wheel and located in the path of the pawl for determining its clutch wheel driving stroke, said screw and sleeve nut being carried by the copy holder head, and the screw having a crank connection to said stop for adjusting it rotatively upon turning of the sleeve nut.

2. The copy holder of claim 1, said copy holder further comprising a frame, said copy holder head carried by the frame, further including a tiltable head structure pivotally mounted on said frame concentrically of the platen shaft for tiltable adjustment into an operator-reading convenience angle.

3. A copy holder as in claim 2, said frame including spaced frame arms, bushings non-rotatively mounted in the frame arms and having internal bearing surfaces for journaling the platen shaft, said bushings also having external bearing surfaces pivotally mounting the tiltable head structure concentrically of the platen shaft.

4. A copy holder as in claim 3, the tiltable head structure having side elements pivotally engaging said external bearing surfaces to provide the pivotal mounting of the head structure on the bushings, said structure also including a face plate extending crosswise thereof behind a data sheet on the platen.

References Cited

UNITED STATES PATENTS

| | | | |
|---|---|---|---|
| 1,637,384 | 8/1927 | Marlatt | 120—32 |
| 2,062,964 | 12/1936 | Blakeman | 120—32 |
| 2,153,103 | 4/1939 | Stevens | 120—32 |
| 2,617,386 | 11/1952 | Kao et al. | 120—32 |
| 3,152,579 | 10/1964 | Rask et al. | 120—32 |

FOREIGN PATENTS 81,571  4/1956  Netherlands.

LAWRENCE CHARLES, *Primary Examiner.*